Nov. 6, 1962 L. A. CHAMBERLAIN 3,061,910
MILLING CUTTER
Filed Oct. 31, 1960
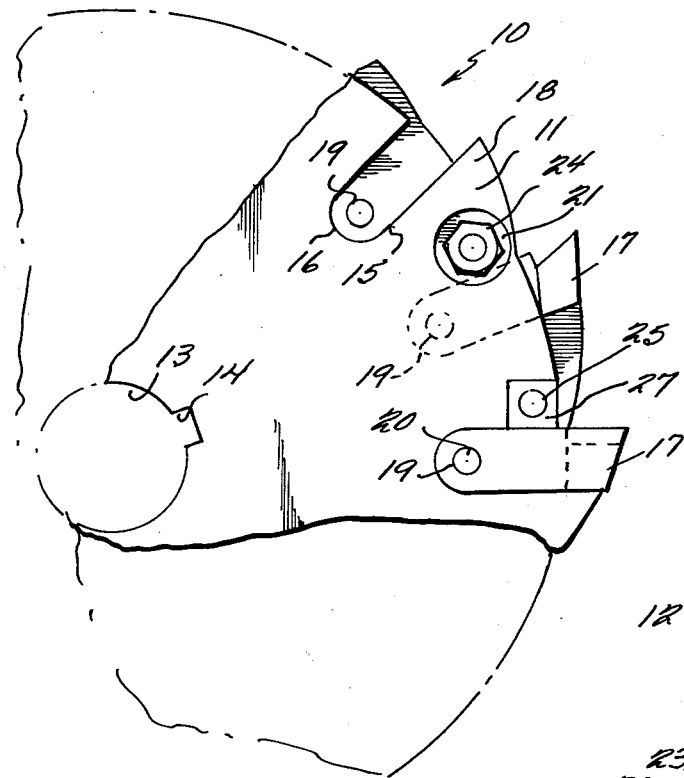
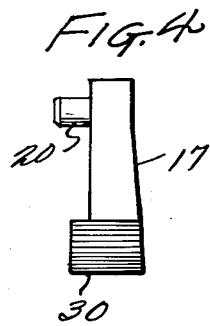
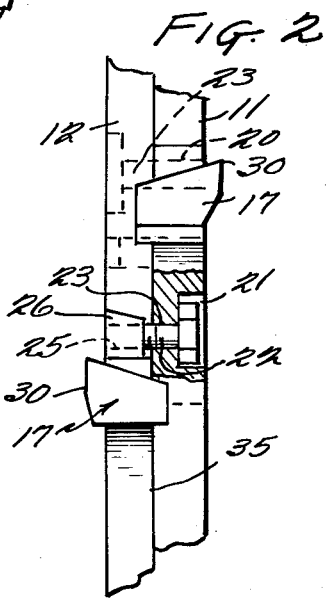
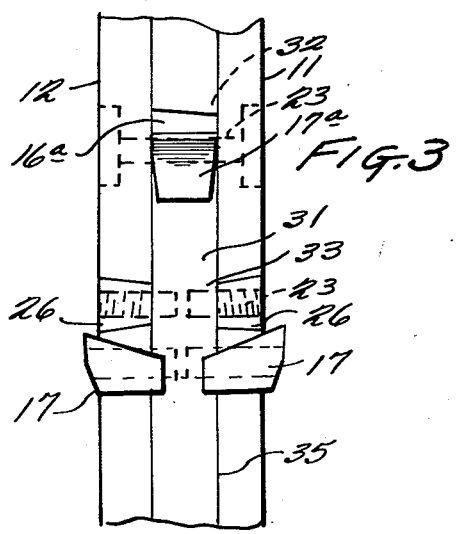
INVENTOR
LESTER A. CHAMBERLAIN
BY
Kimmel & Crowell
ATTORNEYS

United States Patent Office 3,061,910
Patented Nov. 6, 1962

3,061,910
MILLING CUTTER
Lester A. Chamberlain, 207 N. Ravinia Drive,
Dallas, Tex.
Filed Oct. 31, 1960, Ser. No. 65,972
1 Claim. (Cl. 29—104)

The invention relates to a milling cutter, and has as its primary object the provision of an improved milling cutter characterized by at least two cutter disks having confronting ground surfaces, and radially positioned slots, in which slots detachable cutter bits of various selected widths are located, in order that a relatively wide variety of widths of slots may be cut with a single cutter.

An additional object of the invention is the provision of a cutter body or disk which is comprised of at least two confronting portions of a selected width, each provided with a plurality of equidistantly spaced radially positioned cutter bit receiving slots so that cutter bits may be positioned oppositely on the opposite cutter disks, or may be positioned in stepped or staggered relation in accordance with the material to be slotted.

As conducive to a clearer understanding of this invention, it may here be pointed out that under present day conditions it is so essential that all strength possible be obtained from the least weight of material that tolerances in slots, for example, are no longer permitted up to the previous standard of 1/16 of an inch, but may be plus or minus a few thousands. It has, therefore, heretofore been necessary to carry a large numbers of cutters in stock which differ from each other only by a few millimeters. An object of this invention is, therefore, to provide a standard cutter body to which may be applied a variety of widths of bits, differing by only a few thousandths, so that a relatively wide range of slots having very close tolerances may be obtained by the use of a single cutter body.

A further object of the invention is the provision of such a device which comprises at least two oppositely spaced disks, between which may be positioned one or more additional disks for varying the spacing of the slot to a relatively high degree, or when very close variation is required, may have shims or the like positioned either between adjacent disks, or between the cutter bits and the disk.

Still another object of the invention is the provision of such a cutter wherein the bits may be removed and ground exteriorly of the body to a predetermined width and a predetermined diameter.

A still further object of the invention is the provision of such a cutter wherein the bits may be easily secured in and removed from their associated slots for varying the arrangement, the width, or the diameter of the cutter, with a minimum of effort, time, and difficulty.

Still other objects reside in the combinations of elements, arrangements of parts, and features of construction, all as will be more fully pointed out hereinafter and disclosed in the accompanying drawing wherein there is shown a preferred embodiment of this inventive concept.

In the drawing:

FIGURE 1 is a fragmentary plan view of a circular cutter body showing the arrangement of the slots therein, bits positioned therein and one means holding a bit and its associated slot.

FIGURE 2 is an end elevational view of the cutter body of FIG. 1 showing a pair of bits positioned therein in staggered relation; and FIGURE 3 discloses the cutter of FIG. 1 wherein an intermediate disk is positioned between the two side disks, and the bits are positioned in parallel relation, FIGS. 2 and 3 being illustrative of the several diversified arrangements which are possible with the cutter of the instant invention.

FIGURE 4 shows an isolated view of the cutter bit of the several arrangements of the instant invention.

Similar reference characters refer to similar parts throughout the several views of the drawing.

Having reference now to the drawing in detail, the cutter body of the instant invention is generally indicated at 10, and includes a pair of substantially identical confronting disks 11 and 12, the faces of which are ground to extreme smoothness, so that the thickness of the body will be substantially identical throughout its entire area. The members 11 and 12 are provided with central apertures 13, which are aligned, and provided with a key receiving slot 14 for positioning the cutter on a shaft in a conventional manner.

Each of the disks 11 and 12 is provided with a plurality of radial slots or channels 15, each of which has an arcuate bight portion 16, the slots being adapted for the reception of cutter bits generally indicated at 17. The circumference of the disk is irregular to provide protrusions 18 rearwardly of each cutter bit to serve as strengthening and reinforcing portions.

Each disk also contains a plurality of bores or openings 19, the openings 19 being equidistantly spaced, and equidistantly spaced between adjacent slots, the bores 19 being adapted for the reception of dowel pins 20 carried by each cutter bit, the disks 11 and 12 being arranged oppositely so that the bore 19 on one disk is aligned with the center rear portion of the slot 15 on the opposite disk, as best shown in FIG. 2. Each disk is also provided with a recess 21 having a central threaded bore 22, the bore being adapted for the reception of the shank 23 of a bolt, the head 24 of which seats in the recess 21 so that the outer surface of the cutter will be flush at all times.

Bolt shanks 23 are adapted to engage in threaded bores 25 of tapered blocks 26 which seat in polygonal recesses 27 on the opposite cutter blade, the cam blocks being adapted, when the bolt heads are tightened, to hold the bits 17 securely in their associated slots.

Each bit 17 is provided with a conventional cutting edge 30, which projects outwardly beyond the outer face of its associated disk, the bits being of identical size so that a groove of an accurately predetermined width may be cut in any desired metal.

When a wider groove or slot is desired to be cut, an annular ring 31, which may be of any desired thickness, is provided, with grooves spaced equally as in 16, in the two discs. The grooves have the same configuration with spaces for the tapered blocks 26, as in discs 11 and 12. The cutter bits will be held in place by the bolt 23, the same as when used with the two discs. Bits 17a are formed with flush ground opposite faces to engage the adjacent ground faces of discs 12 and 13. In this arrangement openings are provided in the peripheral edge of the annular ring 31 as indicated at 33 to provide access to bolt shanks 23 for the purpose of tightening the cam blocks 26 to hold the bits 17 in related assembly. When one or more spacer rings 31 are employed the cutter bits may be arranged oppositely in each of grooves or slots 15, as shown in FIG. 3. This is particularly suitable when cutting grooves in such metals as iron or steel, but when it is desired to employ the cutter with softer metals, such as aluminum, the cutters may be staggered or spaced in alternate slots as desired, it being readily apparent that certain metals will require a greater number of cutter bits than others.

When variations in the groove width of a minor extent, such for example, as in thousandths of an inch are desired, suitable shims 35 may be positioned between the faces of either the discs 11 and 12, or the confronting faces of either disc 11 or 12 and the centrally positioned annular ring or rings 31.

From the foregoing it will now be seen that there is herein provided a milling cutter which readily lends itself to a wide variety of widths of grooves, channels or slots, wherein the same cutter discs may be employed over a wide range, as well as the same or different cutter bits, in accordance with the particular width and depth of the groove to be cut.

It will also be seen that each individual cutter bit may be removed for sharpening exteriorly of the cutter body, in contradiction to conventional practice wherein it is necessary to sharpen the bits in association with the cutter. This lends to simplicity of operation and material reduction of maintenance costs.

It will also be seen that there is herein provided a milling cutter which accomplishes all the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative, and not in a limiting sense.

I claim:

A milling cutter comprising, in combination, a pair of body discs, each of said discs having circumferential portions defining a plurality of equidistantly spaced radial slots therein, an annular spacer ring having circumferential portions defining a plurality of equidistantly spaced radial slots therein positioned between said body discs, the faces of said discs and said ring being substantially perfectly smooth, cutter bits removably secured in the slots in each of said body discs and in the slots in said annular spacer ring, means comprising oppositely tapered polygonal recesses in each disc, threaded bores in said ring, wedges in said recesses, and bolts extending through said wedges into said bores for releasably securing said discs and said ring together, and integral radial projections on each of said body discs adjacent one edge of the radial slots therein, the bits in said ring being offset radially relative to the bits in said discs, the bits in said discs being transversely aligned.

References Cited in the file of this patent

UNITED STATES PATENTS

| | | |
|---|---|---|
| 417,776 | Eynon | Dec. 24, 1889 |
| 1,194,865 | Muller | Aug. 15, 1916 |
| 2,146,810 | Forward | Feb. 14, 1939 |
| 2,583,309 | Sloderbeck | Jan. 22, 1952 |
| 2,592,382 | Blais | Apr. 8, 1952 |
| 2,805,469 | Greenleaf | Sept. 10, 1957 |

FOREIGN PATENTS

| | | |
|---|---|---|
| 155,161 | Germany | Oct. 22, 1904 |
| 197,981 | Germany | May 5, 1908 |